US006650272B2

(12) United States Patent
Krikorian et al.

(10) Patent No.: US 6,650,272 B2
(45) Date of Patent: Nov. 18, 2003

(54) RADAR SYSTEM AND METHOD

(75) Inventors: Kapriel V. Krikorian, Oak Park, CA (US); Robert A. Rosen, Agoura Hills, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/050,481

(22) Filed: Jan. 16, 2002

(65) Prior Publication Data

US 2003/0132874 A1 Jul. 17, 2003

(51) Int. Cl.$^7$ ............................................... G01S 13/90
(52) U.S. Cl. ........................ 342/25; 342/82; 342/109; 342/111; 342/192; 342/196
(58) Field of Search .............................. 342/25, 73, 82, 342/83, 88, 109, 111, 159, 162, 191, 192, 194, 195, 196

(56) References Cited

U.S. PATENT DOCUMENTS

| | | | | |
|---|---|---|---|---|
| 4,045,795 A | * | 8/1977 | Fletcher et al. | 342/25 |
| 4,067,009 A | * | 1/1978 | Constant | 342/25 |
| 4,132,989 A | * | 1/1979 | Frosch | 342/25 |
| 4,546,354 A | * | 10/1985 | Boles | 342/179 |
| 4,851,848 A | * | 7/1989 | Wehner | 342/25 |
| 4,929,953 A | * | 5/1990 | Brandstetter | 342/190 |
| 5,486,830 A | * | 1/1996 | Axline, Jr. et al. | 342/43 |
| 5,673,050 A | * | 9/1997 | Moussally et al. | 342/22 |
| 5,708,436 A | * | 1/1998 | Loiz et al. | 342/25 |
| 5,886,662 A | * | 3/1999 | Johnson | 342/25 |
| 5,969,662 A | * | 10/1999 | Hellsten | 342/25 |
| 6,020,843 A | * | 2/2000 | Krikorian et al. | 342/25 |
| 2002/0175850 A1 | * | 11/2002 | Barnes et al. | 342/22 |

OTHER PUBLICATIONS

"Ka-band noise SAR simulation", Mogila, A.A., Lukin, K.A.; Kovalenko, N.P.; Physics and Engineering of Millimeter and Sub-Millimeter Waves, 2001. The FourthInternational Kharkov Symposium on, vol:1, pp. 441 –443.*
"High resolution (metric) SAR microsatellite, based on the CNES MYRIADE bus", Aguttes, J.P.; Geoscience and Remote Sensing Symposium, 2001. IGRASS '01. IEEE 2001 International, vol.: 1, pp. 224–226.*

* cited by examiner

Primary Examiner—John B. Sotomayor
(74) Attorney, Agent, or Firm—Leonard A. Alkov; Glenn H. Lenzen, Jr.

(57) ABSTRACT

A method for exciting an antenna with a waveform having a burst width and pulse width scaled proportionately with a selected range scale and a temporal filter to address any ambiguities in range resulting from the transmission of a signal in accordance with the novel waveform. The inventive filtering method includes the step of scanning a beam including a plurality of pulses of electromagnetic energy. The step of scanning the beam includes the step of outputting a beam excited by a waveform having a burst width and pulse width scaled proportionately with a selected range scale. Reflections of these pulses are received as return signals. The returns are processed to extract range in range rate measurements. The range and range rate measurements are compressed to form a plurality of range bins. The pulses are selectively weighted to reduce sidelobes resulting from a subsequent Fast Fourier transform (FFT) operation. The FFT operation is then performed for a predetermined number of pulses in at least one of the range bins at at least one frequency. A second FFT operation is then performed for pixels of azimuth data across the range bins. Finally, ambiguity nulling weights are provided and applied to each pixel of data in each range bin.

42 Claims, 5 Drawing Sheets

RADAR SYSTEM AND METHOD

BACKGROUND OF THE INVENTION

1. Field of the Invention

The present invention relates to imaging systems. More specifically, the present invention relates to radar imaging systems.

2. Description of the Related Art

Imaging techniques are well known and widely used in the art. Certain imaging technologies are better suited for particular applications. For example, radar imagery is widely used for surveillance and reconnaissance as well as target tracking and identification. For radar and other imaging technologies, the ability to clearly resolve and discriminate targets may be essential in meeting objectives specified for a particular application.

One such application involves 'real beam ground mapping'. Real beam ground mapping involves scanning an area, e.g., the earth's surface, using a scanning antenna or an electronically scanned antenna. Returns from an illumination of the surface are then examined for 'back-scatter' or reflections therefrom. As the beam is scanned in azimuth, information is collected with respect to the range direction. At each beam position, the distance of various scatterers may be ascertained for each range cell. This information may then be displayed in a real beam ground mapped image.

Unfortunately, at large side-looking (azimuthal) scan angles relative to the velocity vector, the Doppler spectrum of the clutter spreads out significantly over many Doppler filters relative to the Doppler spectrum of signals received closer to the direction of the velocity vector of the platform over the entire pulse repetition frequency (PRF). In a Real Beam Ground Mapping application, this may lead to the creation of maps with poor image quality.

While range data may be resolved with adequate resolution, currently, resolution of azimuth data with comparable resolution has proved to be problematic. This is due to the fact that azimuth resolution is limited to the width of the beam and degrades as a function of range. Accordingly, the poor resolution of conventional real beam mapping systems limits the ability of the system to discriminate scatterers.

SAR (synthetic aperture radar) has been used for ground mapping. However, currently, SARs require several seconds at each beam position and are therefore too slow for many more demanding (e.g.,military) applications.

"Super resolution" techniques are widely used to sharpen the radar imagery. However, the quality achieved is scene dependent and is not robust. The current techniques do not effectively account for the impact of the radar system on the true scene.

Hence, a need remained in the art for an improved system or method for providing ground mapped images. Specifically, a need remained in the art for a system or method for providing enhanced cross-range (azimuthal) resolution for a real beam ground mapping radar system. This need was met by copending application entitled RADAR IMAGING SYSTEM AND METHOD, filed Jan. 16, 2002 by Kapriel V. Krikorian and Robert A. Rosen, Ser. No. 10/050,296 (hereinafter the "Krikorian et al system") the teachings of which are incorporated herein by reference.

Notwithstanding the fact that Krikorian et al substantially addressed the need for a system for providing enhanced cross-range resolution, an additional problem remains with respect to range and Doppler ambiguity. That is, when a conventional radar system searches in the cross-scan direction for unambiguous returns within the range of, say, 60 miles, the pulse repetition frequency (PRF) must be low. That is, the pulse repetition interval (PRI), which is equal to the pulse width plus the desired range, must be greater than 60 miles to cover the entire distance without ambiguity. Thus, inasmuch as the PRF is the inverse of the PRI, with a long PRI, the PRF must be low. If not, the Doppler spectrum becomes ambiguous and scatter returns from spurious sources of reflection begin to fall in the same range bins on top of each other. This requires processing of the returns from each pulse separately and precludes a desirable coherent integration of same. The only current option then is to integrate the pulses non-coherently by simply summing the magnitudes thereof. Unfortunately, the resulting real beam ground maps reflect the loss of sensitivity associated with this approach.

Hence, a need remains in the art for an improved system or method for providing real beam ground mapped images. Specifically, a need remains in the art for a system or method for long range real beam ground mapping with improved sensitivity at high azimuth look angles.

SUMMARY OF THE INVENTION

The need in the art is addressed by the system and data processing methods of the present invention. There are at least two significant aspects of the invention. One is the provision of a method for exciting an antenna with a waveform having a burst width and pulse width scaled proportionately with a selected range scale. The second is the provision of a temporal filter to address any ambiguities in range resulting from the transmission of a signal in accordance with the novel waveform.

The inventive filtering method includes the step of scanning a beam including a plurality of pulses of electromagnetic energy. Reflections of these pulses are received as return signals. The returns are processed to extract range in range rate measurements. The range and range rate measurements are compressed to form a plurality of range bins. The pulses are selectively weighted to reduce sidelobes resulting from a subsequent Fast Fourier transform (FFT) operation. The FFT operation is then performed for a predetermined number of pulses in at least one of the range bins at least one frequency. A second FFT operation is then performed for pixels of azimuth data across the range bins. Finally, ambiguity nulling weights are provided and applied to each pixel of data in each range bin.

In illustrative embodiments, the step of scanning the beam includes the step of outputting a beam excited by a waveform having a burst width and pulse width scaled proportionately with a selected range scale. The step of selecting and weighting return pulses in the range bins includes the step of selecting and weighting the return pulses to reduce sidelobes resulting from the Fast Fourier transform of the predetermined number of pulses. The step of selecting and weighting return pulses in the range bins includes the step of selecting the pulses based on antenna scan weight and the pulse repetition frequency of the pulses.

Further, in the illustrative embodiment, the step of performing a Fast Fourier Transform for pixels of azimuth data across the range bins includes the steps of selecting Fast Fourier Transform weighting windows and performing a fast Fourier transform for pixels of azimuth data across the range bins based on scan geometry and history of the scan beam.

In the illustrative embodiment, the step of applying nulling weights to each pixel of data in each range bin includes the step of applying nulling weights to each pixel of data in each range bin based on beam scan geometry, scan history, range, range ambiguity, and PRF Doppler ambiguity.

Further, in the illustrative embodiment, the step of applying nulling weights to each pixel of data in each range bin further includes the step of applying nulling weights to each pixel of data in each range bin at each of a plurality of predetermined frequencies. The illustrative embodiment of the inventive method further includes the step of performing pulse detection integration across each of the frequencies of the beam.

The inventive system may be implemented in software running on a processor. In a specific implementation, the system generates a novel radar waveform which effects a higher duty factor and provides better sensitivity. An additional novel aspect of the invention is the provision of a temporal filter in the azimuth direction to significantly reduce Doppler ambiguity.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
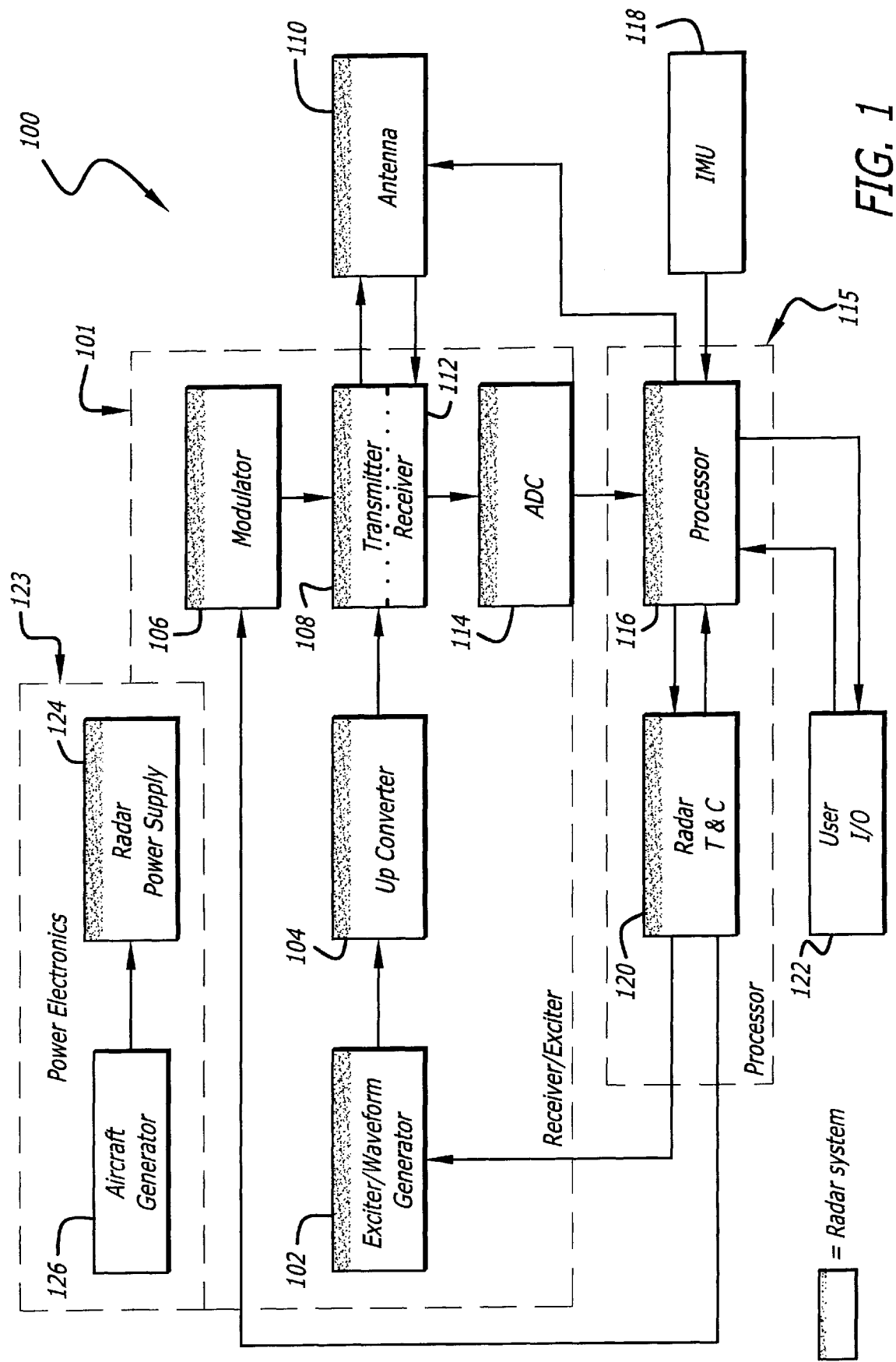
FIG. 1 is a generalized block diagram of a radar system implemented in accordance with the teachings of the present invention.

FIG. 1 is a generalized block diagram of a radar system implemented in accordance with the teachings of the present invention. Those skilled in the art will appreciate that although the present teachings are disclosed with reference to an illustrative radar system implementation, the invention is not limited thereto. The present teachings may be applied to a variety of image processing applications without departing from the scope thereof. The system 100 includes a receiver/exciter 101 of conventional design and construction. As is known in the art, the receiver/exciter 101 includes an exciter/waveform generator 102 that generates a novel and advantageous waveform as discussed more fully below. The radar signal is upconverted by an upconvert stage 104 and filtered, amplified and transmitted by a transmitter stage 108 in response to a reference signal from a modulator 106. The transmit signal is radiated by a radar antenna 110 as a beam of electromagnetic energy.

In an illustrative real beam ground mapping application, scatter returns of the transmit beam as it is reflected from the ground or other surface are received by the antenna 110 and applied to a radar receiver stage 112. The receiver 112 amplifies, filters and downconverts the scatter return in a conventional manner. The convolved, amplified, filtered and downconverted scatter returns are digitized by an analog-to-digital converter stage 114 and fed to a processor 116 in a processor stage 115.

Figure 2:
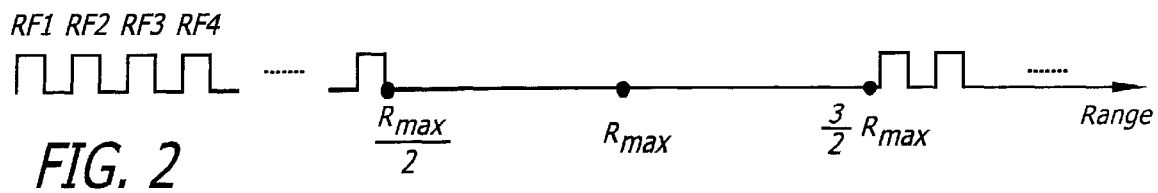
FIG. 2 is a diagram of a waveform generated in accordance with an illustrative embodiment of the method of the present invention.

In accordance with the present teachings, in the illustrative embodiment, processor 116 feeds a signal to the exciter/waveform generator 102 effective to cause the generator 102 to output a waveform such as that shown in FIG. 2. In accordance with the present teachings, the intra-burst PRF and pulse width are selected as a function of the burst width (i.e., the minimum mapping range) to maximize the duty factor within the transmitter or array driver performance limits.

FIG. 2 is a diagram of a waveform generated in accordance with an illustrative embodiment of the method of the present invention. The waveform features a low of pulse repetition frequency (PRF) with a burst width and pulse width scaled proportionately with the selected range scale. In accordance with the present teachings, the intra-burst PRF and pulse width are selected as a function of the burst width (i.e. the minimum mapping range) to maximize the duty factor within the transmitter or array driver performance limits. The duty factor should be high, e.g.:

$$d_T = (1/3)d_B \qquad [1]$$

where $d_B$=burst duty factor=0.5 (or as high as possible) e.g., $d_B$=16.7%.

In accordance with the present teachings, the chirp bandwidth is inversely proportional to range scale (i.e., maximum range $R_{MAX}$):

$$S = c/(2 \cdot R_{MAX} \cdot q) \qquad [2]$$

where 'c' is the speed of light and 'q' is the fractional range resolution.

Those skilled in the art will appreciate that this waveform provides a high duty factor with frequency agility within each burst. At long range, the average duty factor, and thus the sensitivity, is higher for a burst of pulses than for a conventional waveform with a single pulse per PRI. This is because a long PRI is required to avoid eclipsing. Thus, a high duty factor with a conventional waveform would require a long pulse, which would exceed the capacity of the array driver.

Intra-burst modulated pulses for high range resolution at different radio frequencies (frequency agility) should be used to reduce scintillation. In accordance with the present teachings, low PRF burst-to-burst coherency is maintained for Doppler processing on each radio frequency to achieve fine cross-range resolution. At long range operation, the low burst-to-burst PRF results in Doppler ambiguities at high scan angles from the velocity vector. In accordance with the present teachings, the Doppler ambiguities may be reduced by a novel temporal filtering technique that combines radar returns from the different beam positions of a mechanically or electronically scanned antenna. The temporal filtering technique is implemented in software by the processor 116. An illustrative embodiment of the software is illustrated in FIG. 3.

Figure 3:
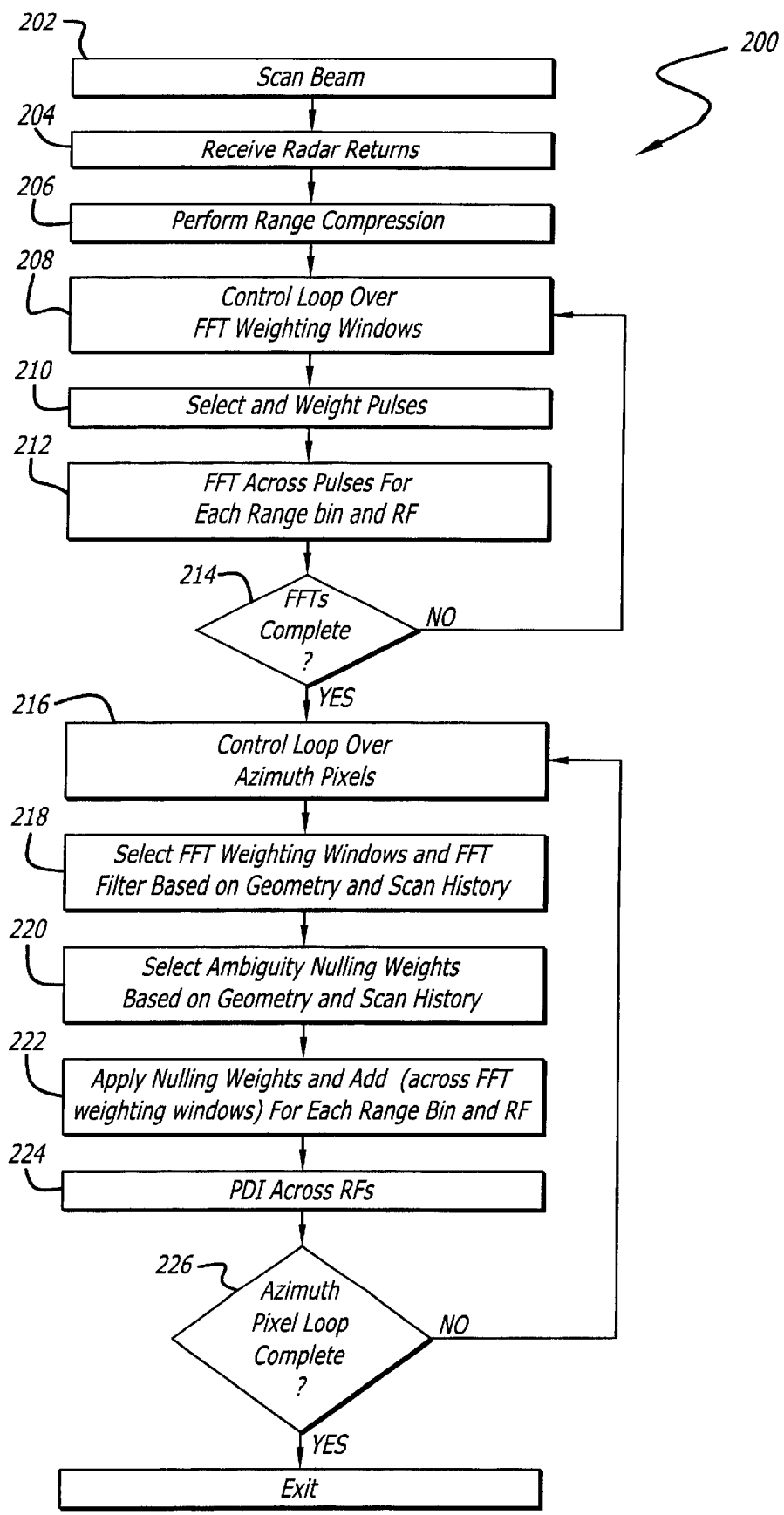
FIG. 3 is a flow diagram showing an illustrative embodiment of software used to implement a temporal filter within the teachings of the present invention.

FIG. 3 is a flow diagram showing an illustrative embodiment of software used to implement a temporal filter within the teachings of the present invention. As shown in FIG. 3, the inventive method 200 includes the step 202 of exciting the antenna 110 of FIG. 1 with the waveform shown in FIG. 2. A beam output by the antenna 110 is reflected by one or more targets and the resulting returns are received at step 204. The returns are processed by the system 100 of FIG. 1 and output as a plurality of range and range rate measurements. At step 206, an intra-pulse measurement (range compression) is performed to form a plurality of range bins as is common in the art. Next, at step 208, the software sets up and executes a control loop over a plurality of FFT weighting windows. The first step in the control loop involves the step 210 of selecting and weighting pulses to reduce sidelobes resulting from FFT filtering as is common in the art. At step 212, the software 200 performs several FFTs within one range bin and one radio frequency based on the PRF and scan rate of the beam. This process is repeated for each range bin and each radio frequency.

Next, the software 200 sets up and enters a control loop over azimuth pixels. The first step in this loop 218 involves a selection of FFT weighting windows and FFT filtering based on scan geometry and scan history. Next, at step 220, ambiguity nulling weights are selected based on scan geometry and scan history. In accordance with the present teachings, the weights are chosen to compensate for range ambiguity and PRF Doppler ambiguity. At step 222, for each range bin the nulling weights are applied to the FFT outputs and the weighted outputs are added across each of the FFT weighting windows. At step 224, a pulse detection integration is performed across each radio frequency and the entire process is repeated until all of the azimuth pixels have been processed.

This process is best illustrated with respect the following example: Consider a radar with a nose mounted electronically scanned antenna of frequency $f_o$=GH$_2$, 3 dB beamwidth of $\theta_o$=3 deg, an ownship velocity v=200 m/s and a pulse repetition frequency PRF=1 KHz. The clutter Doppler frequency is given by:

$$f_c = 2f_o v \cos \theta / c \quad [3]$$

where $\theta$ is the azimuth angle relative to the ownship velocity vector.

The azimuth angles of the Doppler ambiguity are given by:

$$\theta_{amb} = \cos^{-1} - \frac{(f_c + kPRF)c}{2f_o v} \quad [4]$$

where k=±1, ±2, . . .

At a small azimuth angle of θ=10°, the nearest ambiguity is at 24.5° which falls in the far sidelobe region of the antenna and thus has an insignificant effect. However, at a larger azimuth angle of θ=60°, the nearest ambiguities are at 64.9 and 54.8° which are within the boundaries of the broadened antenna mainlobe. The outer ambiguities have an insignificant effect because of the rejection imposed by the low antenna sidelobes.

Figure 4:
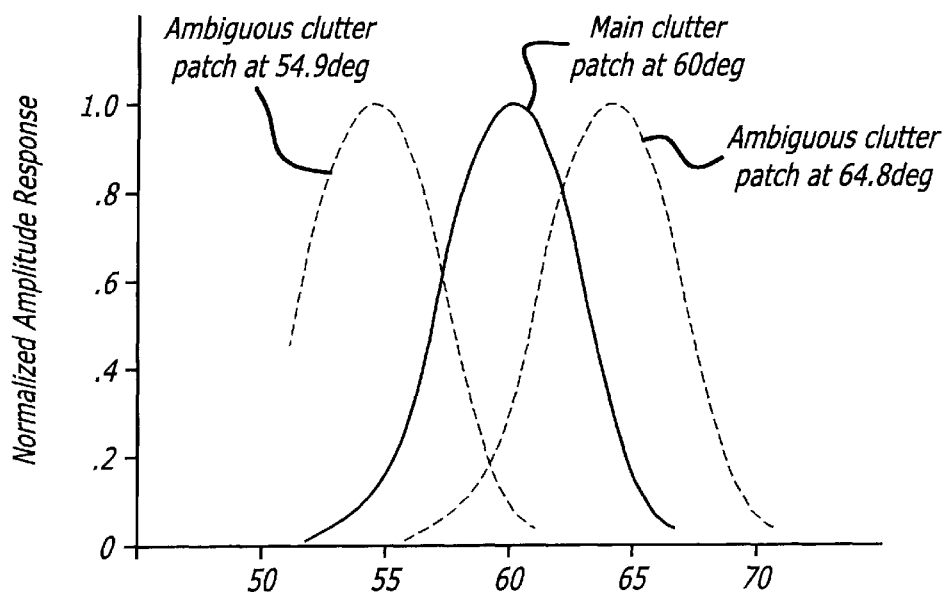
FIG. 4 is a diagram showing a return from a clutter patch of interest and the nearest ambiguities with respect to the illustrative temporal filtering process implemented in accordance with the teachings of the present invention.

FIG. 4 is a diagram showing a return from a clutter patch of interest and the nearest ambiguities with respect to the illustrative temporal filtering process implemented in accordance with the teachings of the present invention. As shown in FIG. 4, as the beam is scanned past the clutter patch of interest, the return from the patch and the two ambiguities is as shown. Overlapping weighted pulse to pulse FFTs over a scanning beam are performed.

Figure 5:
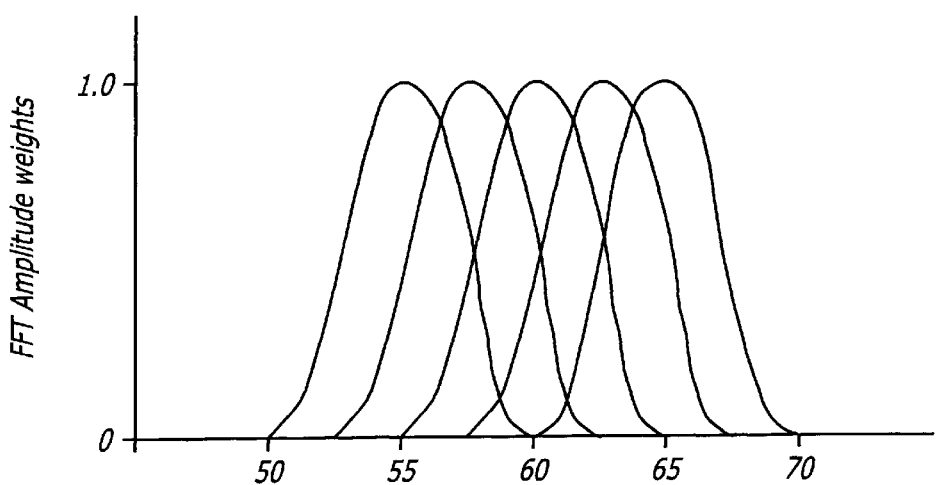
FIG. 5 shows overlapping FFT amplitude weighting windows covering the region between the nearest Doppler ambiguities with respect to the illustrative temporal filtering process implemented in accordance with the teachings of the present invention.

FIG. 5 shows 5 overlapping FFT amplitude weighting windows covering the region between the nearest Doppler ambiguities.

Figure 6:
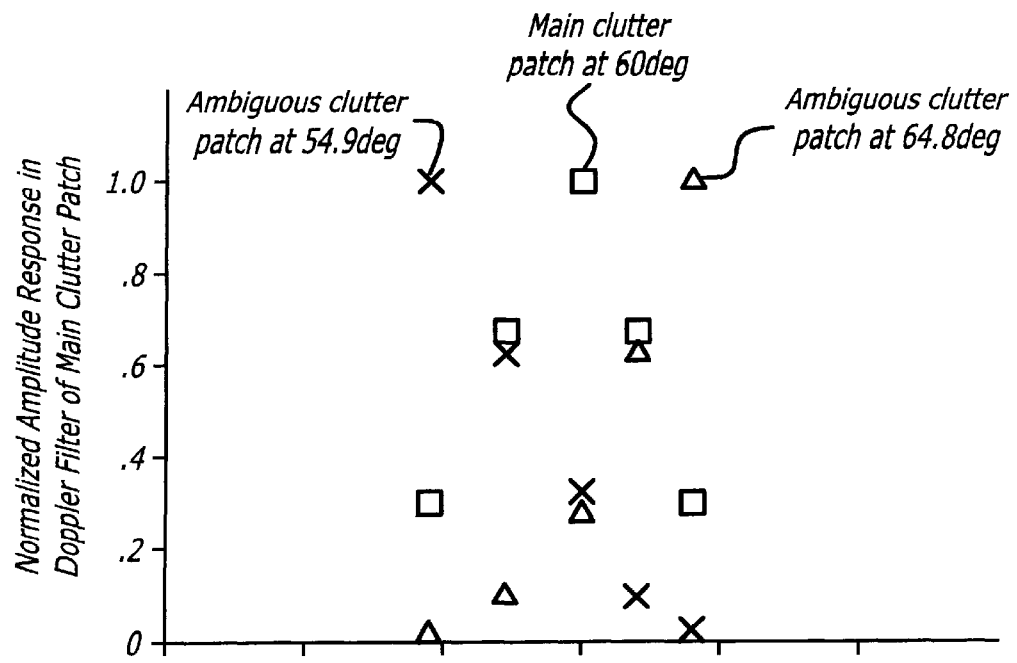
FIG. 6 shows the amplitude response of the main clutter patch and the ambiguous patches in the Doppler filter containing the clutter patch of interest with respect to the illustrative temporal filtering process implemented in accordance with the teachings of the present invention.

FIG. 6 shows the amplitude response of the main clutter patch and the ambiguous patches in the Doppler filter containing the clutter patch of interest. As shown, the response varies differently for the ambiguous patches across the overlapping FFTs.

Figure 7:
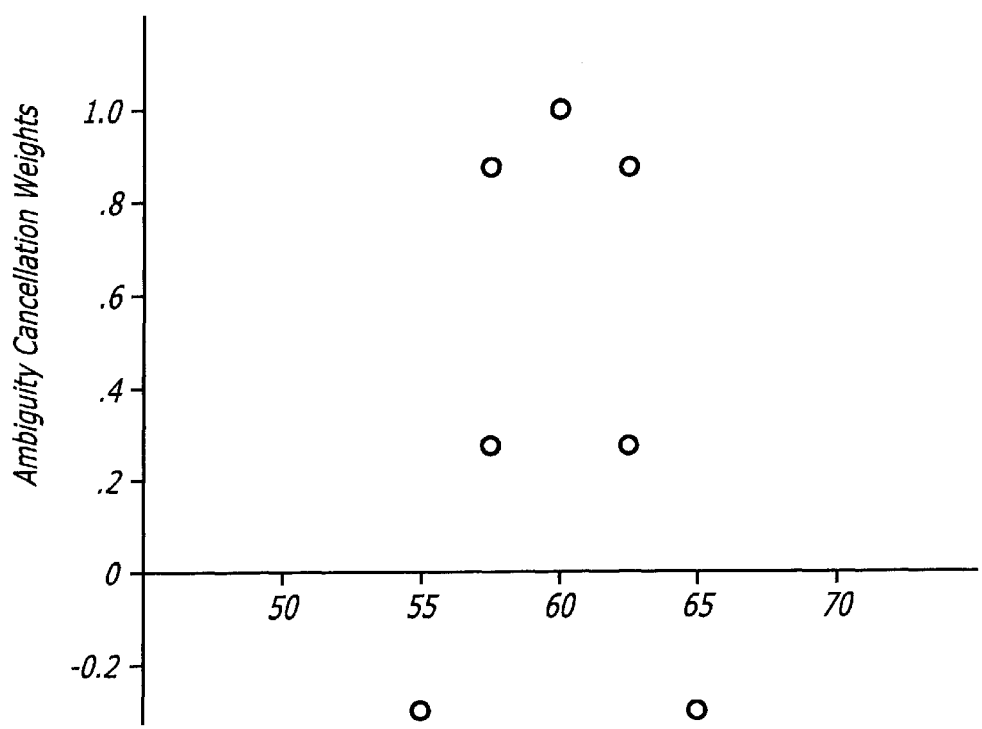
FIG. 7 is a diagram showing ambiguity cancellation weights across FFT arrays with respect to the illustrative temporal filtering process implemented in accordance with the teachings of the present invention.

FIG. 7 is a diagram showing ambiguity cancellation weights across FFT arrays with respect to the illustrative temporal filtering process implemented in accordance with the teachings of the present invention. The corresponding set of weights that cancel the ambiguity of the clutter patches at 64.9 and 54.8 degrees is shown in FIG. 7.

Figure 8:
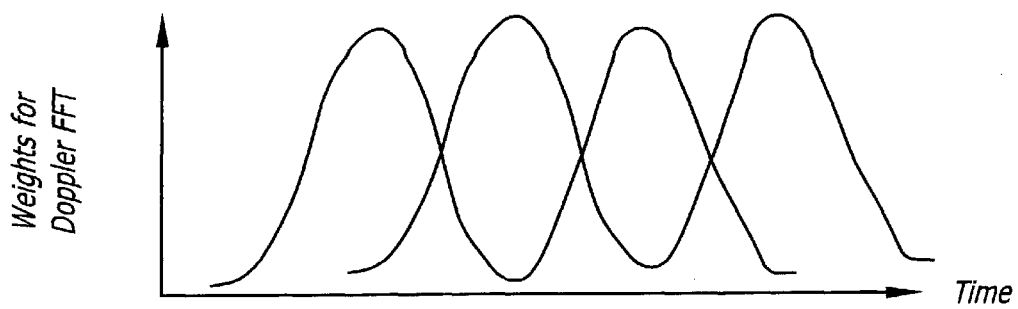
FIG. 8 is a diagram which shows a time domain representation of illustrative weights for a Doppler FFT operation in accordance with the present teachings.
Figure 9:
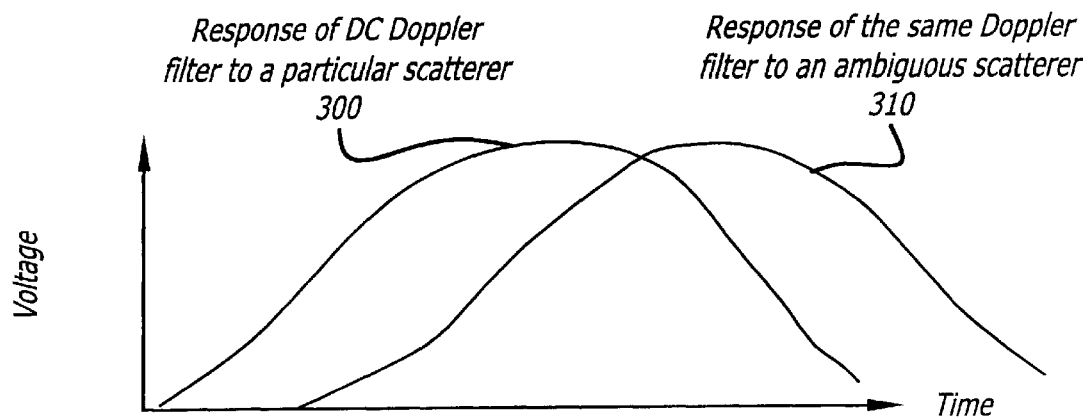
FIG. 9 shows two graphs as a function of time: one being an illustrative response of a DC Doppler filter to a particular scatterer and the other being a response of the same Doppler filter to an ambiguous scatterer.
Figure 10:
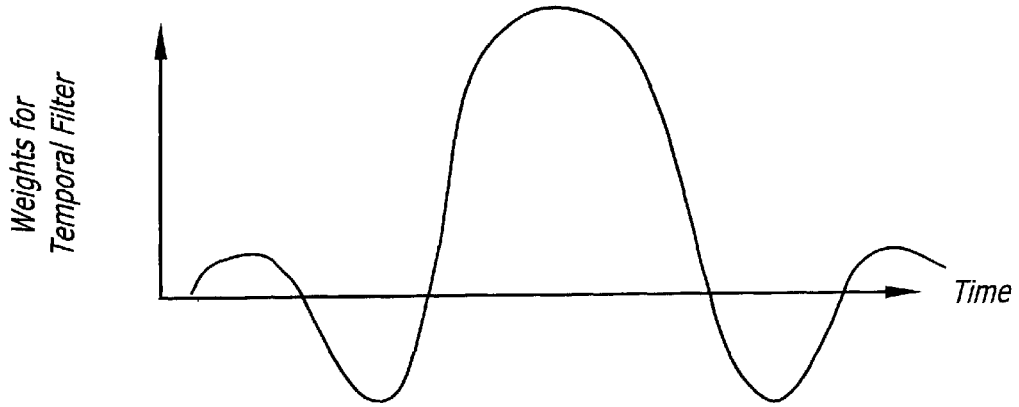
FIG. 10 is a diagram showing illustrative weights for the temporal filter as a function of time in accordance with the teachings of the present invention.

FIGS. 8–10 are diagrams which illustrate the temporal filtering technique for a scanning beam of the present invention.

FIG. 8 is a diagram which shows a time domain representation of illustrative weights for a Doppler FFT operation in accordance with the present teachings.

FIG. 9 shows two graphs as a function of time: one being an illustrative response of a DC Doppler filter to a particular scatterer 300 and the other being a response of the same Doppler filter to an ambiguous scatterer 310.

FIG. 10 of the diagram showing illustrative weights for the temporal filter as a function of time in accordance with the teachings of the present invention. The technique illustrated in FIG. 3 nulls out Doppler ambiguities and applies to the regions of the real beam radar image that has a high azimuth angle relative to the velocity vector. The extent of this region depends on the scan width, aircraft speed, and range. In accordance with the present teachings, the temporal filtering is performed at high scan angles from the velocity vector (e.g., typically >40 deg) where the clutter spreading is larger and higher burst to burst PRFs would otherwise be required to reject Doppler ambiguities. At each beam position, a weighted burst-to-burst FFT is performed. As the beam scans the mainlobe of the same Doppler filter responds more strongly to ambiguous scatterers which corrupted the original beam position. By applying temporal weights and combining the same Doppler filter at each beam position of a scanning beam, the Doppler ambiguities are reduced. This technique allows utilization of low burst PRFs to achieve true cross range resolution (e.g. 20:1 beam sharpening) with a fast scanning beam at long ranges and high scan angles. This technique does not compromise the fast scan rate required for the radar real beam ground map (RBGM) mode.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A data-processing system adapted for use with a system for scanning a beam including a plurality of pulses of electromagnetic energy, receiving reflections of the pulses in the beam as return signals, processing the return signals to extract range and range rate measurements, processing the range and range rate measurements to form a plurality of range bins, and selecting and weighting return pulses in the range bins, the data-processing system comprising:

first means for performing a Fast Fourier Transform for a predetermined number of pulses in at least one of the range bins at at least one frequency;

second means for performing a Fast Fourier Transform for pixels of azimuth data across the range bins; and third means for applying ambiguity nulling weights to each pixel of data in each range bin.

2. The invention of claim 1 wherein the third means includes means for applying nulling weights to each pixel of data in each range bin based on beam scan geometry.

3. The invention of claim 1 wherein the third means includes means for applying nulling weights to each pixel of data in each range bin based on scan history.

4. The invention of claim 1 wherein the third means includes means for applying nulling weights to each pixel of data in each range bin based on range.

5. The invention of claim 1 wherein the third means includes means for applying nulling weights to each pixel of data in each range bin based on range ambiguity.

6. The invention of claim 1 wherein the third means includes means for applying nulling weights to each pixel of data in each range bin based on Doppler ambiguity.

7. The invention of claim 6 wherein the third means includes means for applying nulling weights to each pixel of data in each range bin based on pulse repetition frequency.

8. The invention of claim 1 wherein the third means includes means for applying nulling weights to each pixel of data in each range bin at each of a plurality of predetermined frequencies.

9. The invention of claim 8 further including fourth means for performing pulse detection integration across each of the frequencies of the beam.

10. A system comprising:

first means for scanning a beam including a plurality of pulses of electromagnetic energy;

second means for receiving reflections of the pulses in the beam as return signals;

third means for processing the return signals to extract range and range rate measurements therefrom;

fourth means for processing the range and range rate measurements to form a plurality of range bins;

fifth means for selecting and weighting return pulses in the range bins;

sixth means for performing a Fast Fourier Transform for a predetermined number of pulses in at least one of the range bins at at least one frequency;

seventh means for performing a Fast Fourier Transform for pixels of azimuth data across the range bins; and eighth means for applying nulling weights to each pixel of data in each range bin.

11. The invention of claim 10 wherein the beam is a radar beam.

12. The invention of claim 10 wherein said first means includes means for outputting a beam excited by a waveform having a burst width and pulse width scaled proportionately with a selected range scale.

13. The invention of claim 10 wherein the fifth means for selecting and weighting return pulses in the range bins includes means for selecting and weighting the return pulses to reduce sidelobes resulting from the Fast Fourier transform of the predetermined number of pulses.

14. The invention of claim 10 wherein the fifth means includes means for selecting the pulses based on antenna scan weight.

15. The invention of claim 10 wherein the fifth means includes means for selecting the pulses based on a pulse repetition frequency of the pulses.

16. The invention of claim 10 wherein the seventh means includes means for selecting Fast Fourier Transform weighting windows.

17. The invention of claim 10 wherein the seventh means further includes means for performing a fast Fourier transform for pixels of azimuth data across the range bins based on scan geometry.

18. The invention of claim 17 wherein the seventh means further includes means for performing a fast Fourier transform for pixels of azimuth data across the range bins based on a scan history of the beam.

19. The invention of claim 10 wherein the eighth means includes means for applying nulling weights to each pixel of data in each range bin based on beam scan geometry.

20. The invention of claim 10 wherein the eighth means includes means for applying nulling weights to each pixel of data in each range bin based on scan history.

21. The invention of claim 10 wherein the eighth means includes means for applying nulling weights to each pixel of data in each range bin based on range.

22. The invention of claim 10 wherein the eighth means includes means for applying nulling weights to each pixel of data in each range bin based on range ambiguity.

23. The invention of claim 10 wherein the eighth means includes means for applying nulling weights to each pixel of data in each range bin based on Doppler ambiguity.

24. The invention of claim 23 wherein the eighth means includes means for applying nulling weights to each pixel of data in each range bin based on pulse repetition frequency.

25. The invention of claim 10 wherein the eighth means includes means for applying nulling weights to each pixel of data in each range bin at each of a plurality of predetermined frequencies.

26. The invention of claim 25 further including ninth means for performing pulse detection integration across each of the frequencies of the beam.

27. A method including the steps of:

scanning a beam including a plurality of pulses of electromagnetic energy;

receiving reflections of the pulses in the beam as return signals;

processing the return signals to extract range and range rate measurements therefrom;

processing the range and range rate measurements to form a plurality of range bins;

selecting and weighting return pulses in the range bins;

performing a Fast Fourier Transform for a predetermined number of pulses in at least one of the range bins at at least one frequency;

performing a Fast Fourier Transform for pixels of azimuth data across the range bins; and applying nulling weights to each pixel of data in each range bin.

28. The invention of claim 27 wherein the step of scanning the beam includes the step of outputting a beam excited by a waveform having a burst width and pulse width scaled proportionately with a selected range scale.

29. The invention of claim 27 wherein the step of selecting and weighting return pulses in the range bins includes the step of selecting and weighting the return pulses to reduce sidelobes resulting from the Fast Fourier transform of the predetermined number of pulses.

30. The invention of claim 27 wherein the step of selecting and weighting return pulses in the range bins includes the step of selecting the pulses based on antenna scan weight.

31. The invention of claim 27 wherein the step of selecting and weighting return pulses in the range bins includes the step of selecting the pulses based on a pulse repetition frequency of the pulses.

32. The invention of claim 27 wherein the step of performing a Fast Fourier Transform for pixels of azimuth data across the range bins includes the step of selecting Fast Fourier Transform weighting windows.

33. The invention of claim 27 wherein the step of performing a Fast Fourier Transform for pixels of azimuth data across the range bins further includes the step of performing a fast Fourier transform for pixels of azimuth data across the range bins based on scan geometry.

34. The invention of claim 33 wherein the step of performing a Fast Fourier Transform for pixels of azimuth data across the range bins further includes the step of performing a fast Fourier transform for pixels of azimuth data across the range bins based on a scan history of the beam.

35. The invention of claim 27 wherein the step of applying nulling weights to each pixel of data in each range bin includes the step of applying nulling weights to each pixel of data in each range bin based on beam scan geometry.

36. The invention of claim 27 wherein the step of applying nulling weights to each pixel of data in each range bin includes the step of applying nulling weights to each pixel of data in each range bin based on scan history.

37. The invention of claim 27 wherein the step of applying nulling weights to each pixel of data in each range bin includes the step of applying nulling weights to each pixel of data in each range bin based on range.

38. The invention of claim 27 wherein the step of applying nulling weights to each pixel of data in each range bin includes the step of applying nulling weights to each pixel of data in each range bin based on range ambiguity.

39. The invention of claim 27 wherein the step of applying nulling weights to each pixel of data in each range bin includes the step of applying nulling weights to each pixel of data in each range bin based on Doppler ambiguity.

40. The invention of claim 39 wherein the step of applying nulling weights to each pixel of data in each range bin includes the step of applying nulling weights to each pixel of data in each range bin based on pulse repetition frequency.

41. The invention of claim 27 wherein the step of applying nulling weights to each pixel of data in each range bin includes the step of applying nulling weights to each pixel of data in each range bin at each of a plurality of predetermined frequencies.

42. The invention of claim 41 further including the step of performing pulse detection integration across each of the frequencies of the beam.

* * * * *